(12) United States Patent
Lin et al.

(10) Patent No.: US 11,703,385 B1
(45) Date of Patent: Jul. 18, 2023

(54) LIGHT SENSOR WITH DARK CURRENT ELIMINATION HAVING DUO SWITCH-CAPACITOR CIRCUITS AND A REVERSE CAPACITOR

(71) Applicant: Luxsentek Microelectronics Corp., New Taipei (TW)

(72) Inventors: Wen-Sheng Lin, New Taipei (TW); Sheng-Cheng Lee, New Taipei (TW); Yueh-Hung Ho, New Taipei (TW); Chih-Wei Lin, New Taipei (TW); Chen-Hua Hsi, New Taipei (TW)

(73) Assignee: LUXSENTEK MICROELECTRONICS CORP., New Taipei (TW)

( * ) Notice: Subject to any disclaimer, the term of this patent is extended or adjusted under 35 U.S.C. 154(b) by 0 days.

(21) Appl. No.: 17/952,142

(22) Filed: Sep. 23, 2022

(30) Foreign Application Priority Data

May 31, 2022 (TW) ................... 111120173

(51) Int. Cl.
*G01J 1/46* (2006.01)
*G01J 1/44* (2006.01)
*G01J 1/42* (2006.01)

(52) U.S. Cl.
CPC .............. *G01J 1/46* (2013.01); *G01J 1/4228* (2013.01); *G01J 1/44* (2013.01); *G01J 2001/444* (2013.01)

(58) Field of Classification Search
CPC .... G01J 1/46; G01J 1/4228; G01J 1/44; G01J 2001/444
USPC ....................... 250/214 AB, 214 R
See application file for complete search history.

(56) References Cited

U.S. PATENT DOCUMENTS

| 11,415,459 | B2 * | 8/2022 | Lin .................. G01J 1/0228 |
| 2016/0377483 | A1 * | 12/2016 | Oh ......................... G01J 3/51 356/416 |

\* cited by examiner

*Primary Examiner* — Que Tan Le
*Assistant Examiner* — Mai Thi Ngoc Tran
(74) *Attorney, Agent, or Firm* — Muncy, Geissler, Olds & Lowe, P.C.

(57) ABSTRACT

The present invention provides a light sensor with dark current elimination. A dark current from a covered photodiode and a sensed current from a photodiode are respectively transformed to a dark voltage and a sensed voltage by a controlled integration circuit. A reverse capacitor receives the dark voltage and the sensed voltage to cancel out for each other, and outputs a corrected sensing voltage.

6 Claims, 1 Drawing Sheet

LIGHT SENSOR WITH DARK CURRENT ELIMINATION HAVING DUO SWITCH-CAPACITOR CIRCUITS AND A REVERSE CAPACITOR

BACKGROUND OF THE INVENTION

1. Field of the Invention

The present invention relates to a light sensor and that is characterized by the circuit of dark current elimination.

2. Description of the Prior Art

Light sensors generally use photodiodes to sense optical signals and convert them into electrical signals. Usually, the photodiode mixes a sensed current and a thermal leakage that is also called dark current. In the environment of high temperature and low illumination, such as the sensor under the display screen of the mobile phone, the dark current grows almost exponentially and the sensed current is smaller and that impacts seriously the sensor.

In convention, it is inefficient to eliminate the dark current generally. The present invention proposes a circuit, embedded in the sensor, and that is fast, efficient and sensitive in elimination of dark current.

SUMMARY OF THE INVENTION

In order to solve the above problems, the present invention provides a light sensor with dark current elimination, comprising:
a first switch-capacitor circuit to convert a dark current of a first photodiode, without being exposed to ambient light, into a first voltage;
a second switch-capacitor circuit to convert a sensing current of a second photodiode, with being exposed to the ambient light, into a second voltage; and
a reverse capacitor connected between the first switch-capacitor circuit and the second switch-capacitor circuit, to deduct the second voltage from the first voltage and then to generate an output voltage ($V_{OUT}$).

DESCRIPTION OF THE PREFERRED EMBODIMENTS

Below embodiments accompanied with drawings are used to explain the spirit of this invention to have better understanding for the person in this art, not used to limit the scope of this invention, which is defined by the claims. The applicant emphasizes the element quantity and size are schematic only. Moreover, some parts might be omitted to skeletally represent this invention for conciseness.

A dark current measuring unit uses a photo sensor, avoiding exposed to the light to generate dark current. An ambient light sensing unit uses a photo sensor, illuminated by ambient light to generate a sensing current. The photosensors can be photodiodes and the photodiodes have the same or similar photoelectric properties. For example, both have the same sensing area to generate the same or similar dark current.

Integrating circuits, to convert current into voltage, are used. One circuit convert the dark current to a dark voltage, and another covert the sensing current to a sensing voltage. A deduction circuit is proposed, and the circuit can deduct the dark voltage from the sensing voltage and the final output voltage is the lux voltage.

The integrating circuit is a switch-capacitor circuit, the capacitor is used to accumulate the current to get a voltage and a switch is used to reset the capacitor, i.e. to release accumulated charge of the capacitor. The first switch-capacitor circuit generates the dark voltage and the second switch-capacitor circuit generates the sensing voltage. A reverse capacitor is disposed between the first switch-capacitor circuit and the second switch-capacitor circuit. The reverse capacitor inverts the voltage phase so the sensing voltage deduct the dark voltage from the sensing voltage to obtain the lux voltage. The reverse capacitor means its positive electrode connected to first switch-capacitor circuit and cathode to the second switch-capacitor circuit.

The capacitance of the reverse capacitor determines the measurement sensitivity and efficiency. A small capacitor is used for speeding the measurement. The sensor can measure the lux voltage within 1~2 ms in low illumination environment. In addition, it prevents the switch-capacitor circuit from saturation to reset/discharge the capacitor for keep the function. It determines efficiency of the sensor by controlling the switches.

Figure 1:
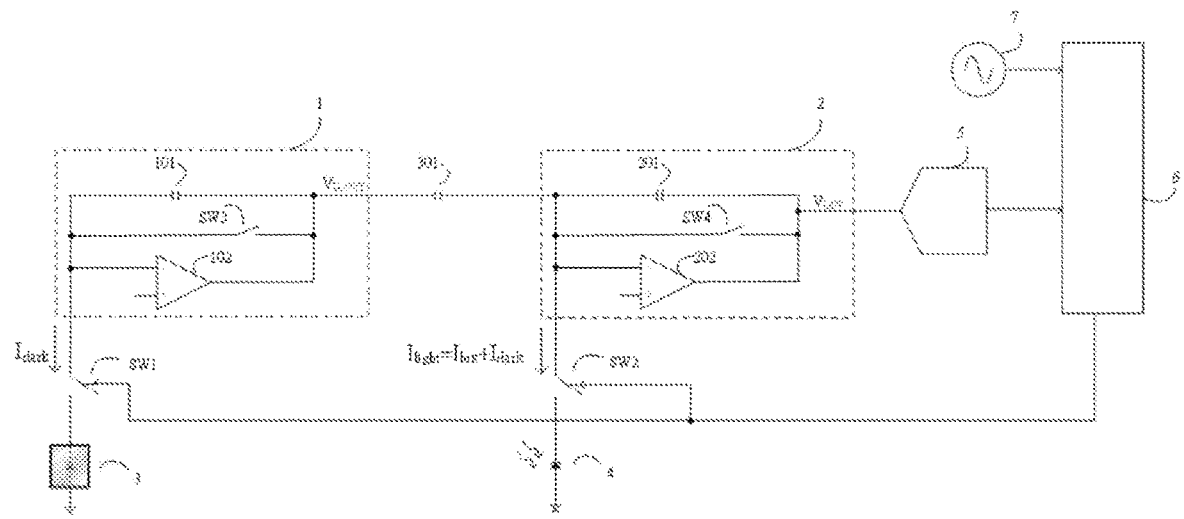
FIG. 1 is a circuit configuration diagram of a light sensor of the present invention.

FIG. 1 shows a circuit architecture diagram of the light sensor of the present invention. The sensor comprises a first photodiode 3, a first switch-capacitor circuit 1 (Switch-Cap Circuit), a second photodiode 4, a second photodiode, a second switch-capacitor circuits 2, a reverse capacitor 301, an analog-to-digital converter 5, a micro-processing unit 6 and an oscillator 7.

The first photodiode 3 is not exposed to ambient light to generate the thermal leakage, i.e. the dark current ($I_{dark}$). The second photodiode 4 is irradiated by the ambient light to generate a sensing current ($I_{light}$), which includes a photocurrent ($I_{lux}$) and a dark current ($I_{dark}$).

The first capacitor 101 of the first switch-capacitor circuit can accumulate the dak current to generate the dark voltage, $V_{D\_OUT}$. The third switching unit SW3 can reset the switch-capacitor circuit. The first amplifier 102 can avoid reverse current by keeping the ground reference voltage. The first photodiode 3 is connected to the first switch-capacitor circuit via the first switching unit SW1. The saturation of the capacitor 101 can be avoided by controlling the switching of the third switching unit SW3.

The second switch-capacitor circuit 2 can convert the sensing current ($I_{light}$) into a sensing voltage, $V_{light}$. The second switch-capacitor circuit 2 has the same structure and function as the first switch-capacitor circuit 1, and includes a second capacitor 201, a fourth switching unit SW4 and a second amplifier 202.

The positive electrode and the negative electrode of the reverse capacitor are connected to the first switch-capacitor circuit 1 and the second switch-capacitor circuit 2, respectively. The reverse capacitor can invert the dark voltage to the second switch-capacitor circuit 2, and reduced the voltage from the sensing voltage. As a result, the second switch-capacitor circuit 2 directly exports $V_{OUT}$, that is the lux voltage.

The formula for converting current to voltage is as follows:

$$V_{D\_OUT} = I_{dark} * (T_{int}/C_{int}) \tag{1}$$

$$V_{light} = (I_{lux} + I_{dark}) * (T_{int}/C_{int}) \tag{2}$$

$$V_{OUT} = Puc * (V_{light} - (C_{iv}/C_{int}) * V_{D\_OUT}) \tag{3}$$

$T_{int}$ and $C_{int}$ are the accumulation (integration) time and capacitance, respectively, which are positively correlated with the pulse length Puw, $C_{iv}$ is the reverse capacitance, and Puc is the number of pulses. For simplifying the calculation, let $C_{iv}/C_{int}=1$, and $V_{OUT}=V_{light}-V_{D\_OUT}$.

Next, it is to convert the output voltage $V_{OUT}$ into a digital signal by the ADC 5. The digital signal is input to the micro-processing unit 6 as the controlling parameters of the switching units including SW1, SW2, SW3 and SW4. The oscillator 7 generates the stable pulses and is employed as clock of the micro-processing unit 6.

Figure 2:
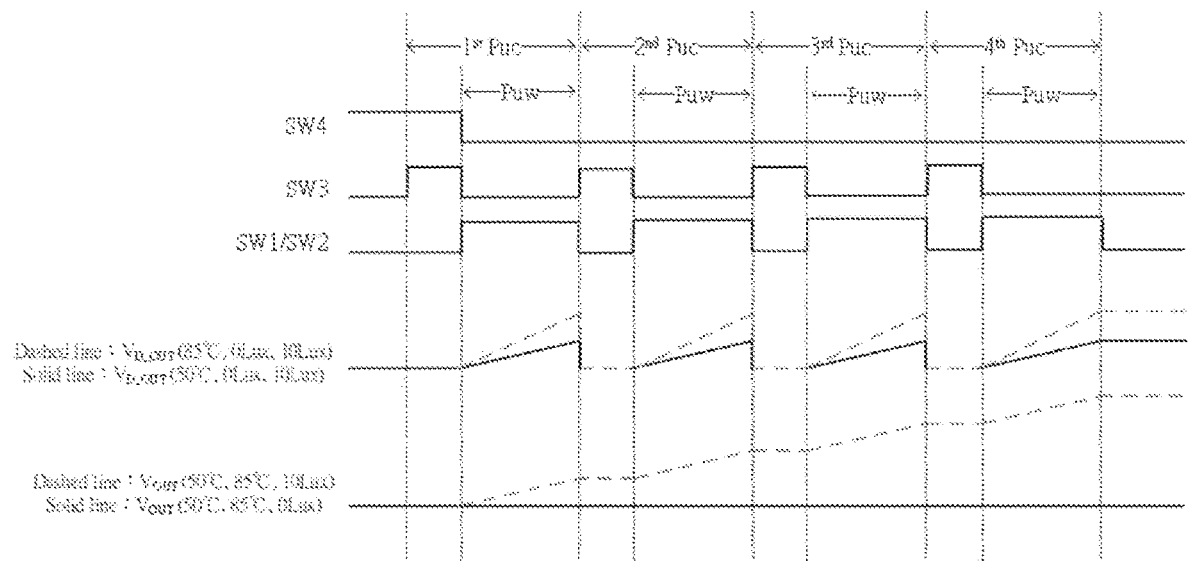
FIG. 2 is an operation timing diagram of the light sensor of FIG. 1.

It can eliminate the thermal disturbance, i.e. dark current, from the sensing signal by coordinating these switching units, the time frame is shown as FIG. 2, and the detail is as below.

The first switching unit SW1 and the second switching unit SW2 are synchronized and it means the dark currents of the photodiodes 3 and 4 are also synchronized.

The first switch-capacitor circuit 1 is configured to generate the correct dark voltage quickly. The first capacitor 101 can accumulate the current quickly to generate the first voltage $V_{D\_OUT}$ and be refreshed to avoid saturation, so the third switching unit SW3 resets the first capacitor 101 for each switching period.

The second switch-capacitor circuit 2 is configured to generate and enhance the lux sensing signal, so the second capacitor 201 can accumulate the small lux current for a longer period. The faster and more efficient if the second capacitor 201 is smaller the value. But if the second capacitor 201 is too small, the saturation occurs. The second capacitor 201 is refreshed about few cycles and it will not be saturated in the accumulation period. In this embodiment, the saturation time of the second capacitor 201 is 3 cycles.

Generally, in order to simplify the calculation, the first capacitor 101 and the second capacitor 201 have the same capacitance value and are saturated in about 3-5 cycles.

The first switching unit SW1 and the second switching unit SW2 are synchronized to ensure that the first capacitor 101 and the second capacitor 201 have the same dark currents (dark voltage).

The SW3 is ON for discharging in the OFF of the SW1(the SW2 is also OFF). In the ON state of the SW1, the SW3 is OFF for accumulation of the dark current. The SW3 is out-phase to the SW1 and the SW2. The SW4 is turned on to initialize the measurement at first switching period and then turned off to start to accumulate the lux current. The capacitor 201 will be saturated after 3 to 5 pulse periods to complete the sensing.

The output voltage $V_{OUT}$ is the sensing voltage reduced by $V_{D\_OUT}$ through the reverse capacitor 301 as the following calculation:

$$V_{OUT}=V_{light}-V_{D\_OUT}=V_{lux}+V_{D\_OUT}-V_{D\_OUT}=V_{lux} \quad (4)$$

What is claimed is:

1. A light sensor with dark current elimination, comprising:
    a first switch-capacitor circuit for converting a dark current of a first photodiode, without being exposed to ambient light, into a first voltage;
    a second switch-capacitor circuit for converting a sensing current of a second photodiode, with being exposed to the ambient light, into a second voltage; and
    a reverse capacitor connected to a first switch-capacitor circuit and the second switch-capacitor circuit, wherein the reverse capacitor inverts the first voltage to deduct the first voltage from the second voltage, and generates an output voltage ($V_{OUT}$).

2. The light sensor according to claim 1, further comprising:
    a first switching unit to switch the first photodiode;
    a second switching unit to switch the second photodiode; and
    a micro-processing unit, wherein a first switching unit and the second switching unit is controlled by the micro-processing unit which receives the output of the second switch-capacitor circuit via an analog-to-digital converter.

3. The light sensor according to claim 2, wherein
    the first switch-capacitor circuit includes a first amplifier, a third switching unit and a first capacitor; and
    the second switch-capacitor circuit includes a second amplifier, a fourth switching unit and a second capacitor, wherein the third switching unit and the fourth switching unit is controlled by the micro-processing unit.

4. The light sensor according to claim 3, wherein the third switching unit resets the first voltage for each switching period, and the fourth switching unit resets the output voltage for 3~5 switching periods.

5. The light sensor according to claim 3, wherein the third switching unit are out-phase to the first switching unit and the second switching unit.

6. The light sensor according to claim 1, wherein the first photodiode and the second photodiode have the same sensing area.

* * * * *